March 26, 1929.  C. D. RYDER  1,706,986
MOTOR VEHICLE SIGNAL
Filed Aug. 18, 1922  2 Sheets-Sheet 1
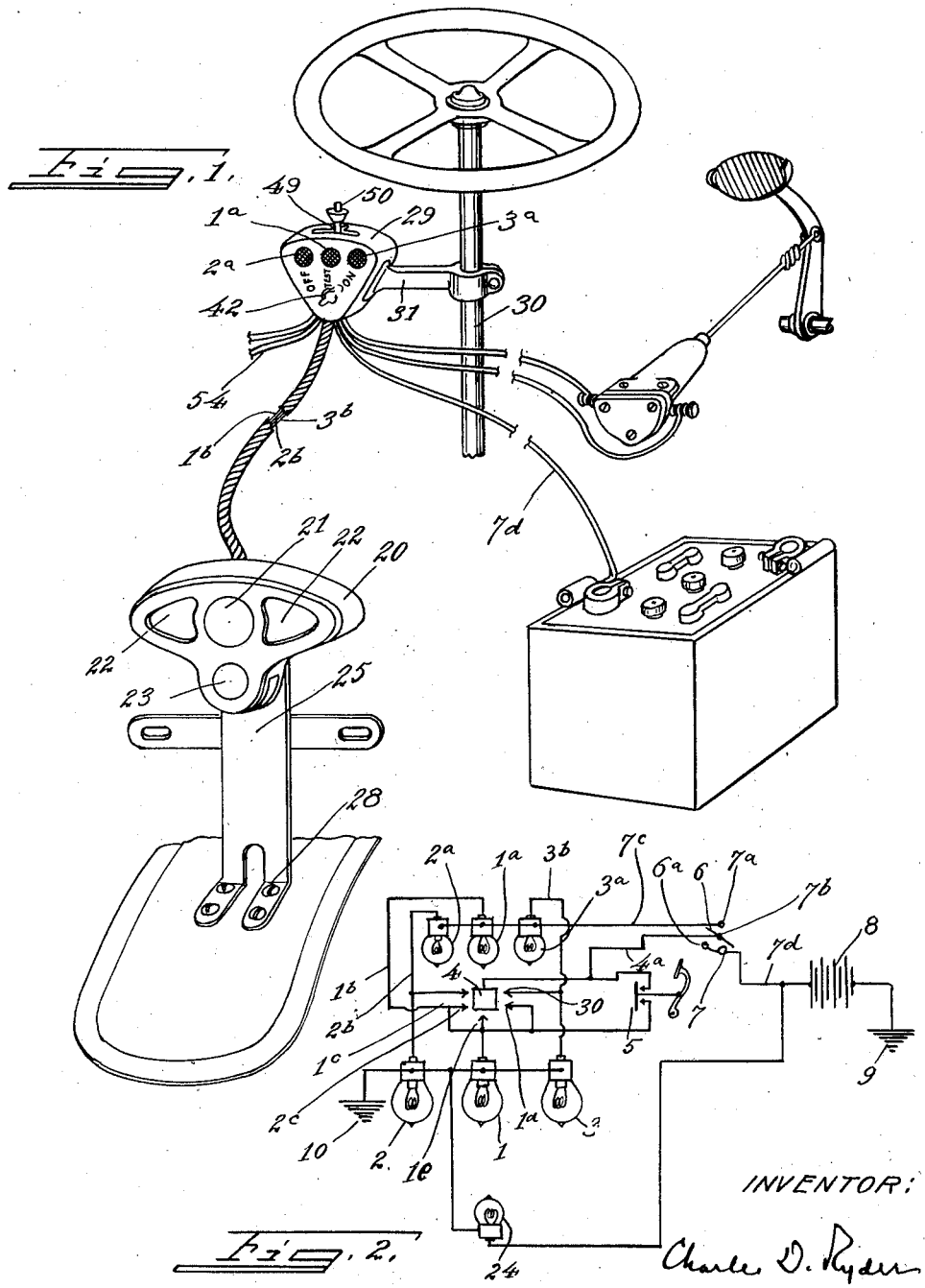

March 26, 1929.  C. D. RYDER  1,706,986
MOTOR VEHICLE SIGNAL
Filed Aug. 18, 1922  2 Sheets-Sheet 2
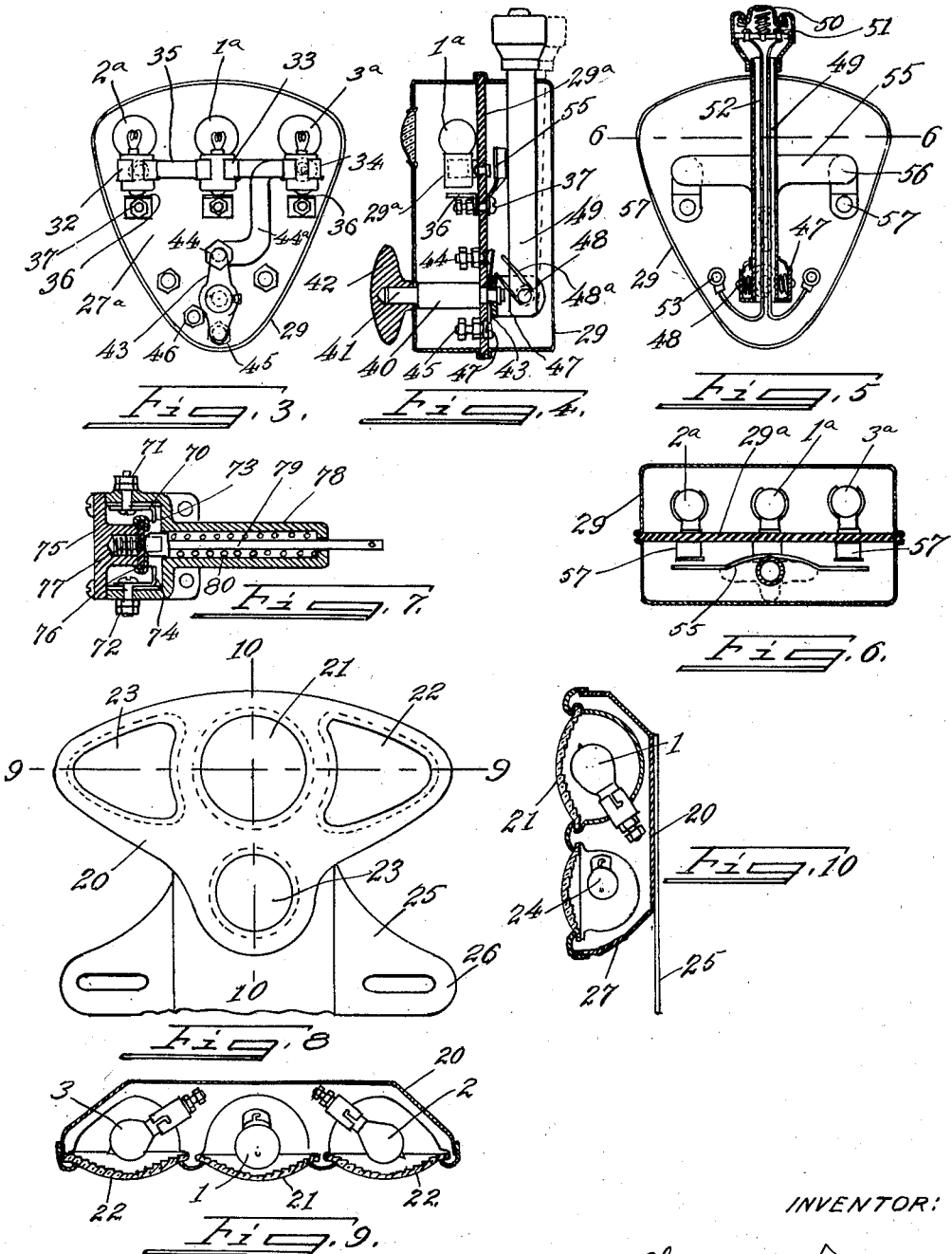
INVENTOR:
Charles D. Ryder
BY
ATTORNEYS.

Patented Mar. 26, 1929.

1,706,986

UNITED STATES PATENT OFFICE.

CHARLES D. RYDER, OF COVINGTON, KENTUCKY, ASSIGNOR, BY MESNE ASSIGNMENTS, TO THE THOS. J. CORCORAN LAMP CO., OF CINCINNATI, OHIO, A CORPORATION OF OHIO.

MOTOR-VEHICLE SIGNAL.

Application filed August 18, 1922. Serial No. 582,601.

My invention relates to devices for use by automobile drivers to indicate by a series of lights the direction in which he is about to move.

I am aware that various mechanical signals, such as arrows, dials and the like, have been adopted for motor vehicle signals, and also that lights which show up the word "Stop" and in some cases call for directions as reflected on targets and the like, which are projected.

A mere signal by means of a light that the brakes are being applied to a vehicle is not sufficient to give a complete warning signal. It is desirable that a simple signal be produced, which, without mechanical devices, will clearly tell a driver behind a motor vehicle just what that motor vehicle proposes to do.

According to my invention a series of lights are provided, particularly a central light and two differently colored lights at the sides of the central light. With such an arrangement the central light alone will indicate a mere stop of the vehicle, the central and left hand lights will indicate a left turn, and the central and right hand lights, a right turn, while all three lights at once, (if this is desired) will indicate intention to back. This system constitutes the essential object of my invention.

It is also my object to combine such a signal system with the usual tail light and license tag holder and to provide a simple control switch.

In connection with the control switch it is my object to provide for a test lighting to see if the rear lights are operating or for a telltale indication whenever the lights are put into use when on the road.

With these various objects and other advantages in view I provide that certain construction and arrangement of parts, an example of which is hereinafter more specifically pointed out, and the novelty residing therein duly claimed.

In the drawings,

Figure 1 is a perspective view showing the parts of the system as they are mounted in operation.

Figure 2 is a wiring diagram of the system.

Figure 3 is a detail front elevation of the tell-tale device and setting switch.

Figure 4 is a side elevation of the setting switch with the casing removed.

Figure 5 is a rear elevation of the setting switch with the casing removed.

Figure 6 is a section on the line 6—6 of Figure 5.

Figure 7 is a detail section of the brake pedal switch.

Figure 8 is a front elevation of the signal casing.

Figure 9 is a section on the line 9—9 of Figure 8.

Figure 10 is a section on the line 10—10 of Figure 8.

Referring first to the wiring diagram, it will be noted that there is a central rear light 1 (same to have a red lens in front of it) and two side lights 2 and 3 (each with a green lens. There are tell-tale lights corresponding to the lights above named, viz, the central light $1^a$ and the side lights $2^a$ and $3^a$.

There is a three-way switch 4 and a brake pedal switch 5, which may also be located as shown. The switch and extra contact of 6 are used for the purpose of testing or tell-tale connection for lights $1^a$, $2^a$ and $3^a$.

There is the battery 8 and two ground connections 9 and 10.

The tell-tale lights $1^a$, $2^a$ and $3^a$ are all connected by wire $7^c$ in series with the switch contact $7^a$; switch contact 7 is connected with the battery by wire $7^d$. Lights $1^a$, $2^a$ and $3^a$ are connected by conductors $1^b$, $2^b$ and $3^b$ with the lights 1, 2 and 3, respectively.

The wires $1^b$ and $2^b$ have connections with the switch contacts $1^c$ and $2^c$. Wires $1^b$ and $3^b$ have connections with the switch contacts $1^d$ and $3^d$. The wire $1^b$ is connected with a single switch contact $1^e$, and the switch 4 is connected to one switch contact of the brake pedal switch, while the wire $1^b$ is connected with the other contact of this brake pedal switch. The connection $4^a$ is made from the switch center $7^b$ to the switch member 4. Contact $6^a$ is strapped to contact 7 and wire $7^d$ runs from either one to the battery 8.

The battery is connected with each light socket 1, 2 and 3 by means of a ground, since the one wire system of lighting has been adopted. Otherwise, a separate conductor connecting up with each of said lamp sockets would have to be run from the battery instead of the ground wire.

Omitting consideration of the brake pedal and tell-tale switches, it is evident that by throwing the switch 4 to the right, the central and right hand lights will be lit, the circuit passing through the wires 4ª and 7ᵈ to the battery, and from the selected lamps to the ground and the battery to the ground.

If the brake switch 5 is used, then by the connection shown, the only effect will be to light up the light 1 by connecting up the wire 1ᵇ with the wire 4ª.

Now taking the switch 6 and considering 7 and 7ª connected. In such an event the three tell-tale lights will be maintained lighted continuously, the current passing through the small tell-tale lights on the wire 7ᶜ, thence through the wires 1ᵇ, 2ᵇ and 3ᵇ to the rear or main lights, and through their filaments to the ground. There will not be sufficient current passing through the large lights to illuminate them, due to the great resistance of the filaments of the smaller lights. The moment the switch 4 is thrown in, the main lights will receive the main current by the conductors above described and the small lights being in shunt, will go out or practically so. This serves as a tell-tale and is controlled by switch 6.

If the switch 6 is opened, as in the diagram, the entire system is relieved from control by the switch 4. With the switch in contact with 6ª only, then the tell-tale lights do not operate at all. When the switch 6 connect 7 and 7ª the brilliancy of the tell-tale light will indicate the presence or absence of a ground in the wires to light 1, 2 or 3.

Coming next to the description of the mechanism employed by me in utilizing the wiring and signal system set forth.

At the rear of the car is provided a housing 20 having a red lens 21 located centrally of its wide upper part, and to the upper part and to the sides of this lens, two green or other colored lenses 22. The lights 1, 2 and 3 are located behind these lenses within the casing.

Below the light 1 and lens 21 is another red lens 23, behind which is located in the casing, the usual red tail light 24. In the wiring diagram this tail light is shown as connected up with the battery on a separate circuit.

The casing 20 is formed on a mounting plate 25, which has slotted ears 26 to receive the mounting bolts of a license tag and a transparency 27 is mounted in the base of the casing 20 to permit the light of the tag by the tail light. The plate 25 has feet 28 for mounting on the rear mud guard, or other convenient place at the back of a vehicle.

Referring to the switch mechanisms there is a casing 29 mounted preferably on the steering column casing 30 of the motor vehicle by means of a bracket arm 31. The switch control bar in the present device is used also as the carrier of the electric horn switch button of the vehicle, but it will be understood that this is merely a specialized feature of the invention.

Mounted centrally within the casing is a light socket mounting plate 29ª of non-conductive material, this plate having on its rear face (considering the disposition of the vehicle) a series of three light socket clips 32, 33 and 34, which are electrically connected with and connected to each other by a strap 35.

The lights 1ª, 2ª and 3ª are inserted in their clips and the terminals of the sockets are placed in contact with the spring strips 36, which are held by binding posts 37 to the plate 29ª.

Mounted within a tube 40 in the casing 29 is a shaft 41 controlled by an external handle 42. This handle has a central and right and a left position to be marked preferably "Test," "Off" and "On" respectively. This shaft operates a switch corresponding in function to the switches 6 and 7.

A spring plate 43 is provided which straddles the shaft 41 and is moved by it. There is a terminal post 44 and a terminal post 45, the post 45 being strapped to another post 46. The spring plate has contact buttons 47 at each end, to engage the inwardly exposed ends of the terminal posts, so that when the control handle is vertical, the shaft 41 is connected with the terminal 44 and also the terminal 46. When the handle is to the right, the terminal 45 (connected to 46) is the only terminal in electrical connection with the shaft 41.

The terminals 45 and 46 correspond to the terminals 6ª and 7 of the wiring diagram, and the terminal 44 is strapped at 44ª to the clip connecting strap 35, said terminal 44 corresponding to terminal 7ª.

Electrically connected with the shaft 41 is a clip 47 which is free to rock on the shaft. A pin 48 in this clip serves to pivotally mount a hollow control bar or tube 49, the end of which protrudes from the upper end of the casing 29. A T-slot in the upper end of the casing serves to guide the tube in its movement, and a spring 48ª on the pin 48 tends to keep the tube in position in the leg of the T to retain it frictionally within the arms of T, forcibly moved out of the leg and into a selected arm. The tube has mounted in its upper end a switch button 50 adapted to connect contacts 51 of the electric horn device of the vehicle. The conductors 52 extend down through the tube and are connected to posts 53, whence wires extend to the horn, as at 54.

Connected to the terminal or spring strip 36 for the central light 1ª on the plate 29 is a T-shaped spring plate 55, the arms 56 of which are curved inwardly at the ends. The act of moving the controller tube 49 to the left or right will act to force the left or right end of the plate 55 against a contact tongue 57, of which there are two, connected to the contacts 36, 36, for the lights 2ª and 3ª.

It may now be observed that the conductor uniting all light bolts to terminal 7ª of the diagram corresponds to the straps 35 together with the strap 44ª, which extends from 44 (terminal 7ª).

The leads from 1ᵇ, 2ᵇ and 3ᵇ, to the three way switch are found in the three bulb terminal contacts 36. The lead 7ᵈ extends from terminal 46 to the battery. From the three binding posts 37 of contacts 36 extend the wires 1ᵇ, 2ᵇ and 3ᵇ (Figure 1 and diagram), to the rear lights. The three way switch is the bar 49, and plate 55 and the bar is connected to the battery when the handle 41 is turned to either test or on positions, since in either case the shaft 41 is in contact with terminals 46 or 45. When the handle 42 is turned to off position, the connection of shaft 41 is entirely broken so that this position of shaft 41 corresponds to the position shown in the diagram for switch 6.

The leads from the wires 1ª, 2ª, and 3ª to the three way switch are the tongues 57, 57 and the plate 55, each of which is set behind one of the binding posts 37.

The switch bar 49 is of conductive material and is always electrically connected with the shaft 41, which corresponds to the contact 7ᵇ of the diagram. When in the leg of the T (Figure 6) it makes no contact. When pulled forward it contacts with the cross strip 55 only, which responds to contact 1ᵉ. When thrown to the left it contacts with the strip 55 and forces it against the left hand tongue 57, corresponding to a closing of contacts 1ᶜ and 2ᶜ Also when thrown to the right it makes contact with the strip and the right hand tongue 57.

From the terminal 45 a wire 60, extends to a brake pedal switch and from this switch another wire 61 extends to the terminal post 37 of the central light 1ª. These correspond to the connections to the foot pedal switch on the diagram so that when the switch is closed by the foot in applying the brakes, the result will be a lighting of the central light.

Such a brake pedal switch is shown in Figure 7, in which 70 is the casing having terminals 71 and 72 and contacts 73 and 74.

In a socket in the head 75 of the casing is a contact plunger 76, energized toward contact by a spring 77. In the tubular position 78 of the casing is a rod 79 which forces the contact member 76 to open position by a spring 80. The rod 79 is connected to the brake pedal 81, by any desired form of adjustable connection so that when the pedal is depressed, the switch may close.

I wish it understood that the mechanical device described, as a switch mechanism, and control of the lighting system is capable of other forms of construction, the special form evolved being for the purpose of providing a neat tell-tale device or tester, and combining the switch with the motor horn, as well as providing a readily operable device whereby the switch will stay closed until moved away from its adjusted position to the leg of the T-shaped slot therefor. Also the mechanism provides a simple operating feature because the throw of the bar 49 is in the same direction as the vehicle is to turn. A mere tap 49 on the bar will throw it to neutral as its spring forces it into the leg of the T.

The signals will be as good in the day time as at night as the colors of the lights will show by day, if the illumination is sufficient. My invention contemplates the use of a fairly large candle power bulb as compared to the usual light bulb.

Having thus described my invention what I claim as new and desire to secure by Letters Patent is:—

A tell tale switch mechanism comprising a casing, openings in said casing, three tell tale lamps, mounting members for mounting said lamps in said casing adjacent said openings in substantial alignment and forming one terminal of said lamps, means of electrically connecting all of said members together, terminal pieces mounted in said casing forming the other terminals for said lamps, the ends of the two outer terminal pieces forming circuit controlling contacts, a depressible contact member formed on the center of said terminal pieces and extending laterally adjacent said contacts, a movable switch bar, means guiding said bar for movement into contact with said contact member and for causing depression of said member into contact with either of said contacts, selectively dependent upon the direction of movement of said bar.

CHARLES D. RYDER.